(12) United States Patent
Kang

(10) Patent No.: US 10,248,138 B2
(45) Date of Patent: Apr. 2, 2019

(54) WATER SUPPLYING METHOD

(71) Applicant: LSIS CO., LTD., Gyeonggi-do (KR)

(72) Inventor: Min-Gu Kang, Gyeonggi-do (KR)

(73) Assignee: LSIS CO., LTD., Anyang-Si, Gyeonggi-Do (KR)

( * ) Notice: Subject to any disclaimer, the term of this patent is extended or adjusted under 35 U.S.C. 154(b) by 306 days.

(21) Appl. No.: 15/171,949

(22) Filed: Jun. 2, 2016

(65) Prior Publication Data

US 2016/0357195 A1 Dec. 8, 2016

(30) Foreign Application Priority Data

Jun. 2, 2015 (KR) .................. 10-2015-0078228

(51) Int. Cl.
| | | |
|---|---|---|
| *G05D 7/06* | (2006.01) | |
| *F17D 3/00* | (2006.01) | |
| *E03B 1/02* | (2006.01) | |

(52) U.S. Cl.
CPC ............ *G05D 7/0676* (2013.01); *E03B 1/02* (2013.01); *F17D 3/00* (2013.01)

(58) Field of Classification Search
CPC ................................. G05D 7/0676; F17D 3/00
See application file for complete search history.

(56) References Cited

U.S. PATENT DOCUMENTS

| | | | |
|---|---|---|---|
| 4,562,552 A | 12/1985 | Miyaoka | |
| 2009/0271045 A1* | 10/2009 | Savelle, Jr. | ............ A01G 25/167 |
| | | | 700/284 |
| 2012/0239211 A1* | 9/2012 | Walker | .................... A01G 25/16 |
| | | | 700/284 |
| 2013/0220027 A1 | 8/2013 | Calderin | |

FOREIGN PATENT DOCUMENTS

| | | |
|---|---|---|
| JP | 2000-066731 A | 3/2000 |
| JP | 2005-316932 A | 11/2005 |
| JP | 2006-344186 A | 12/2006 |
| JP | 2007-120263 A | 5/2007 |
| JP | 2012-079202 A | 4/2012 |
| JP | 2012-099049 A | 5/2012 |
| KR | 10-0724497 | 5/2007 |

* cited by examiner

*Primary Examiner* — Nathan L Laughlin
(74) *Attorney, Agent, or Firm* — K&L Gates LLP

(57) ABSTRACT

Some embodiments may include a water supply system for supplying water based on a predetermined planned daily supply amount of water. While the worries supplied, it may be determined whether a second time has reached after a predetermined time passed from a first time. When it is determined that the second time has reached, an accumulated amount of the supplied water may be measured. A difference between the measured accumulated amount of the supplied water and the planned daily supply amount of water may be calculated. The planned daily supply amount of water may be corrected by adding the calculated difference to the planned daily supply amount of water after the second time. Water may be supplied based on the corrected planned daily supply amount of water.

5 Claims, 10 Drawing Sheets

WATER SUPPLYING METHOD

CROSS REFERENCE TO RELATED APPLICATIONS

This application claims the benefit of Korean Patent Application No. 10-2015-0078228, filed on Jun. 2, 2015, which is hereby incorporated by reference in its entirety.

BACKGROUND

Technical Field

The present disclosure relates to a water supply methods for a water supply system and, more particularly, to a water supply system capable of changing a planned daily supply amount of water in real time according to a predicted daily demand amount of water and a water supplying method for the same.

Description of the Related Art

In a water distribution network, water is supplied from a water intake facility to a filtration plant or from the filtration plant or water booster station to a water reservoir using a pump.

To automatically operate the pump, a plan for operation of the pump is generally made by predicting one-day water demand or two-day water demand at constant time intervals (e.g., every 15 minutes or 1 hour) using the flow rate at the discharge portion of the water reservoir in calculating a planned amount of water to be supplied using the pump.

However, in conventional cases, when there is a difference between the planned amount of water to be supplied to the water reservoir using the pump and the amount of actually supplied water, the demand predicting back-end compensates for the difference. However, this method has limits.

Accordingly, if the difference is persistently produced for a long time, the amount of actually supplied water often becomes larger or smaller than the planned amount by an accumulated difference. Accordingly, if the accumulated difference increases for a long time, the plan for operation of the pump deviates greatly from the actually supplied amount, and thus automatic operation is expected to fail.

Accordingly, regarding the result of prediction of water demand including an error, there is a need for a method for compensating for the result of prediction after a current time in real time.

In addition, according to the conventional error compensation technology, an error with respect to prediction result data according to time is compensated for by applying a weight to demand prediction data within a threshold duration for the calculated demand prediction data. However, this composition method is unclear and is has a limit when it is applied to the amount of supplied water which varies in real time

SUMMARY

It is an aspect of some embodiments of the present disclosure to provide a water supplying method for accurately predicting a demanded amount of water per time to maximize efficiency of control of the amount of water.

In accordance with one aspect of some embodiments of the present disclosure, a water supply method includes: supplying water based on a predetermined planned daily supply amount of water; determining whether a second time has reached after a predetermined time passed from a first time while performing the supplying of the water; measuring, when it is determined that the second time has reached, an accumulated amount of the supplied water; calculating a difference between the measured accumulated amount of the supplied water and the planned daily supply amount of water; correcting the planned daily supply amount of water by adding the calculated difference to the planned daily supply amount of water; and supplying water based on the corrected planned daily supply amount of water.

According to an embodiment of a water supplying method of the present disclosure, a demanded amount of water per time is predicted by applying various environmental elements and time elements. Thereby, control of the amount of water may be effectively performed according to the demand.

DETAILED DESCRIPTION

Hereinafter, embodiments of the present disclosure will be described in detail with reference to the accompanying drawings. It should be understood that the present disclosure is not limited to the following embodiments, and that the embodiments are provided for illustrative purposes only. It will be appreciated by those skilled in the art that various substitutions, modifications and variations can be made in the present disclosure without departing from the scope of the present disclosure.

In describing the present disclosure, a detailed description of well-known functions and constituents will be omitted if it is determined that such description can unnecessarily obscure the main points of the present disclosure. Numbers (e.g., first, second, etc.) used herein are merely intended to distinguish one constituent from another.

Although the terms used in this specification are selected, as much as possible, from general terms that are widely used at present, terms that are arbitrarily selected by the applicant may be used in a particular case. In this case, meanings of these terms are disclosed in corresponding description parts of the disclosure. Accordingly, it should be noted that the present disclosure should be understood based on practical meanings of the terms rather than on the names of the terms.

In this specification, when one constituent is mentioned as being "connected" or "coupled" to another, it should be understood that this means the one constituent may be directly connected or coupled to another one or another constituent may be interposed between the constituents, unless stated otherwise.

That is, in this specification, the term "include" should not be understood as pre-excluding possibility of existence of constituents or steps other than the constituents or steps disclosed herein.

Reference will now be made in detail to embodiments of the present disclosure, examples of which are illustrated in the accompanying drawings. Wherever possible, the same reference numbers will be used throughout the drawings to refer to the same or like parts.

Hereinafter, a method for predicting the water demand according to an embodiment of the present disclosure will be described with reference to FIG. 1.

Figure 1:
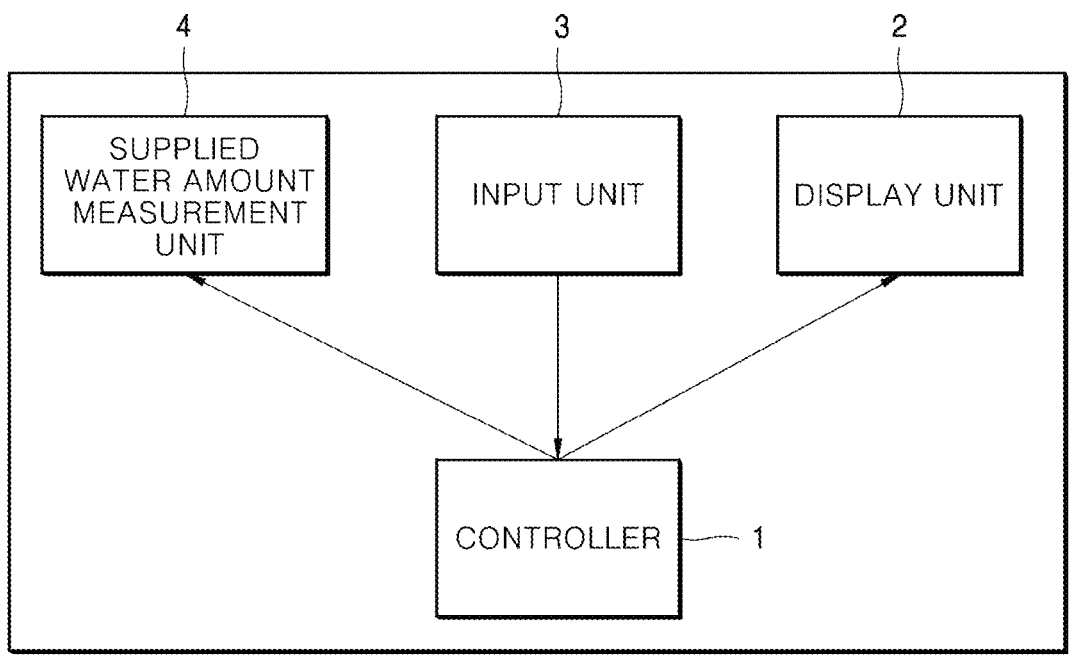
FIG. 1 is a block diagram illustrating a water supply 100 according to an embodiment of the present disclosure.

FIG. 1 is a block diagram illustrating a water supply 100 according to an embodiment of the present disclosure.

Referring to FIG. 1, the water supply 100 may include a controller 1, a display unit 2, an input unit 3 and a supplied water amount measurement unit 4.

The input unit 3 may receive an operational command according to manipulation of an operator. The input unit 3 is a device for implementation of various types of user input.

The controller may receive record data about a daily amount of supplied water from the supplied water amount measurement unit 4 according to an operational command input by the user input through the input unit 3.

The controller 1 predicts a daily demand for water based on the received record data about the daily amount of supplied water, and performs a control operation to output the predicted daily demand and provide the same for the operator through the display unit 2.

The display unit 2 may output the operation status of predicting the daily demand and the result data about the predicted daily demand based on control of the controller 1.

The controller 1 may periodically collect the record data, or store, in the storage unit (not shown), the data collected in real time and the demand amount data predicted according to the embodiment.

The controller 1 may read data from the storage unit (not shown), and dynamically collect data at certain time intervals in real time according to a period (days, hours) of the record data.

The controller 1 may calculate and register an upper limit and lower limit through analysis of measurement values of the record data based on the collected supply record data. In addition, the controller 1 may compare the values with the upper limit and lower limit and extract BAD values (abnormal data) beyond the limits and GOOD values (normal data) within the limits. Thereby, the controller 1 may use only values within the limits as data for predicting the demand among the extracted values. According to another embodiment, the limits may be arbitrarily set by the user.

The controller 1 may perform or stop demand prediction according to whether a flag value is changed, based on a predetermined value.

Algorithms for demand prediction of the controller 1 are configured in a sub-unit module. The sub-unit module may determine an algorithm to use according to the manual mode flag and the auto mode flag.

When the controller 1 is in the manual mode, one demand prediction algorithm selected by the user is used. When the controller 1 is in the auto mode, N demand prediction algorithms are combined (ensemble algorithms) and executed.

The controller 1 may determine the number of combinations (ensemble algorithms) of the algorithms and compute a result of each combination through a learning procedure. In addition, the controller 1 may yield an optimum algorithm combination according to a predetermined condition.

That is, the controller 1 may compute a result through the learning procedure performed for each group of combined algorithms, apply a weight to algorithms used for each combination, and produce a combination of algorithms assigned a higher weight or a combination of algorithms including a smaller error with respect to a reference prediction result data as the optimum algorithm combination.

Thereby, the controller 1 may compute demand prediction data and re-examine the computed result. Re-examination of the demand prediction result may compute a separate test module set or another algorithm combination.

In predicting the demand in real time, an error compensator (not shown) of the controller 1 may perform demand prediction per time, and a prediction error may increase in proportion to the difference between the current time and a later prediction time.

Accordingly, the error compensator may compensate for the error using a daily prediction result as a weight to an hourly prediction result for data of a certain duration from the current time.

That is, for pre-calculated demand prediction data, the error compensator may compensate for an error with respect to the hourly prediction result data by applying a weight to demand prediction data within a threshold duration.

Hereinafter, a method for correcting a planned supply amount of water in real time according to an embodiment of the present disclosure will be described in detail with reference to FIGS. 2 to 8.

Hereinafter, a detailed description will be given of a method for calculating a planned supply amount of water according to the result of demand prediction and correcting the same in real time, with reference to FIGS. 2 and 3.

Figure 2:
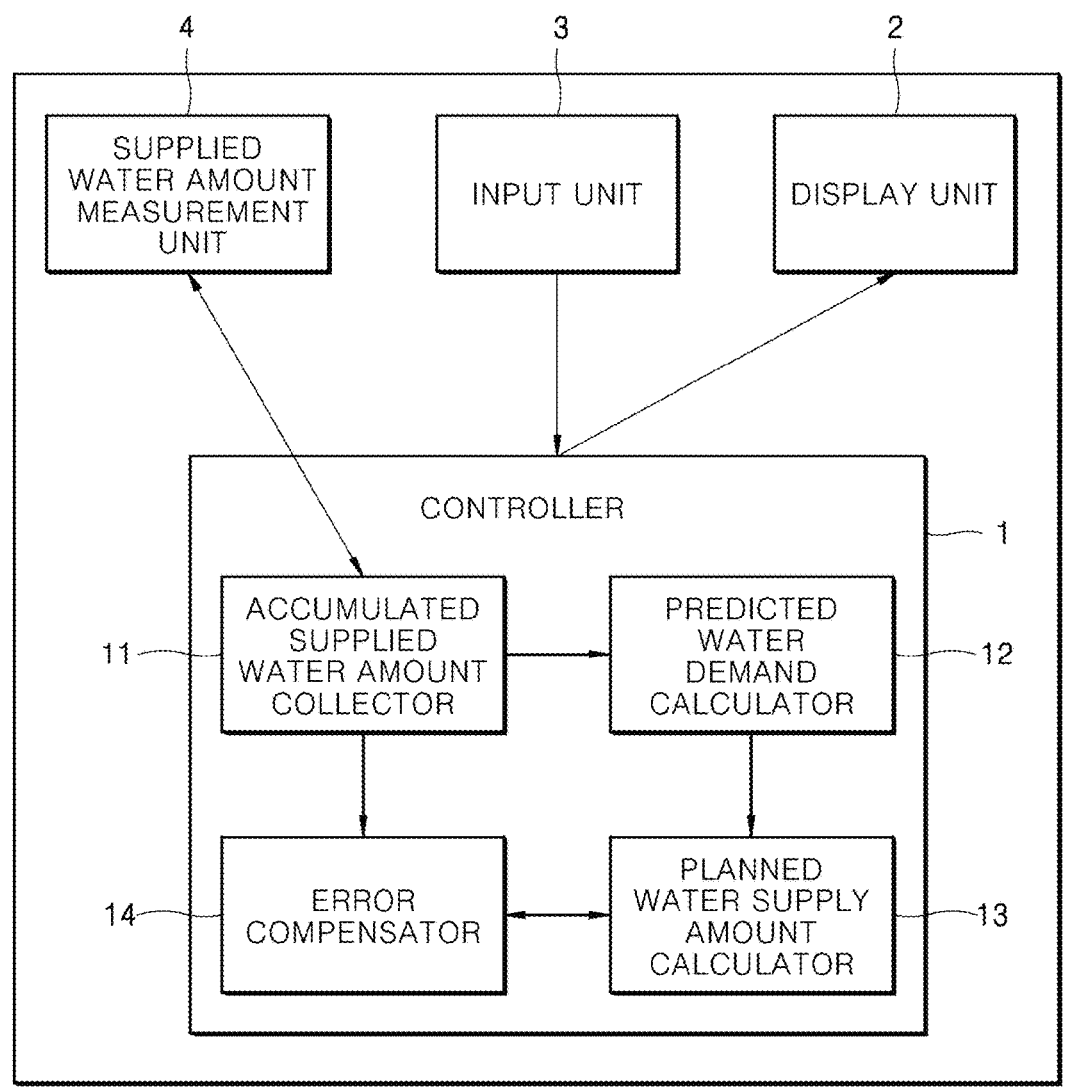
FIG. 2 is a block diagram illustrating a controller 1 (FIG. 1) according to an embodiment of the present disclosure.

FIG. 2 is a block diagram illustrating a controller 1 (FIG. 1) according to an embodiment of the present disclosure.

As shown in FIG. 2, the controller 1 may include an accumulated supplied water amount collector 11, a predicted water demand calculator 12, a planned water supply amount calculator 13 and an error compensator 14.

The accumulated supplied water amount collector 11 may collect record data about an accumulated amount of water supplied by a pump (not shown), and store the data about the accumulated amount of water in a storage unit (not shown).

The predicted water demand calculator 12 may predict and calculate a demand amount of water based on the data about the accumulated amount of the supplied water.

The planned water supply amount calculator 13 may calculate a planned daily supply amount of water or a planned hourly supply amount of water based on the pre-calculated predicted demand amount of water.

The error compensator 14 may change (or correct) the precalculated planned supply amount of water. More specifically, the error compensator 14 may change the planned supply amount of water based on the accumulated amount of supplied water measured in real time. More details will be described later with reference to FIGS. 3 to 8.

Figure 3:
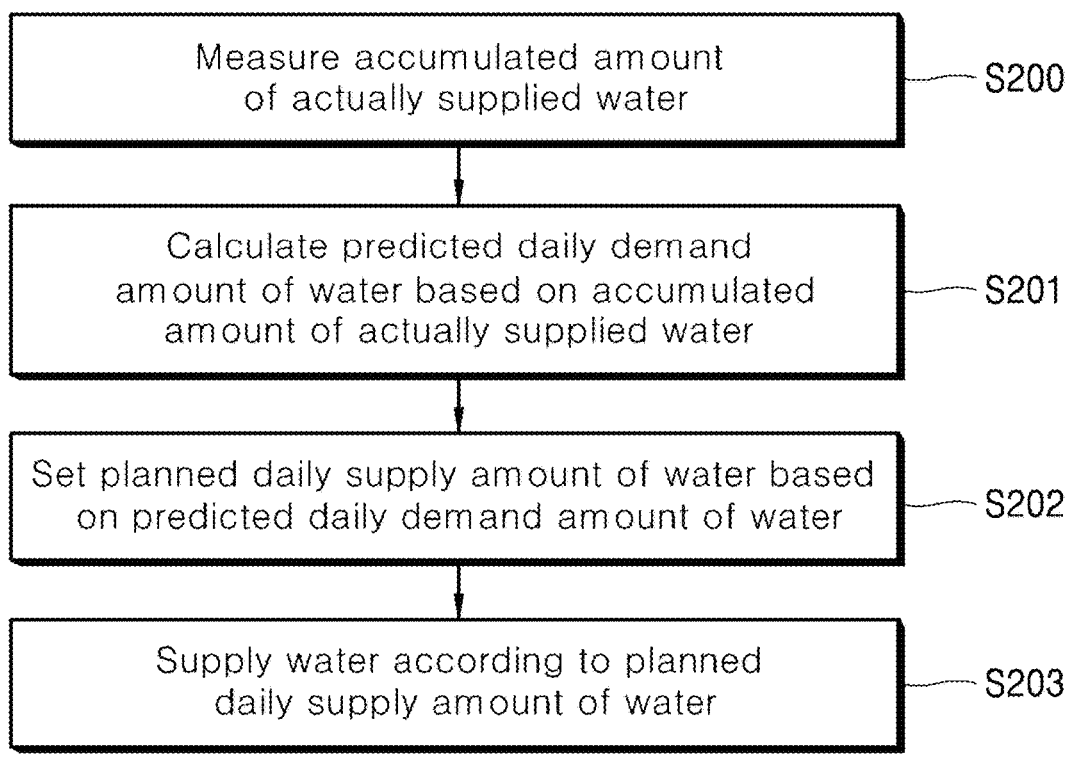
FIG. 3 is a flowchart illustrating a water supplying method according to an embodiment of the present disclosure.

FIG. 3 is a flowchart illustrating a water supplying method according to an embodiment of the present disclosure.

Referring to FIG. 3, the supplied water amount measurement unit 4 measures an accumulated amount of actually supplied water in real time with a predetermined periodicity (S200).

Once the accumulated amount of actually supplied water is measured, the accumulated supplied water amount collector 11 in the controller 1 acquires record data about the accumulated amount of actually supplied water.

Once the record data about the accumulated amount of actually supplied water is acquired, the predicted water demand calculator 12 in the controller 1 calculates a predicted daily demand amount of water based on the accumulated amount of actually supplied water according to a predetermined prediction method (S201).

Once the predicted daily demand amount of water is calculated, the planned water supply amount calculator 13 in the controller 1 sets a planned daily supply amount of water based on the predicted daily demand amount of water (S202).

The planned daily supply amount of water may include plan information about the amount of water to be supplied between the current time at which the planned daily supply amount of water is calculated and the midnight (24:00) of the date including the current time.

Once the planned daily supply amount of water is set, the controller 1 supplies water based on the planned daily supply amount of water through the pump (S203).

Hereinafter, a method for correcting the amount of previously supplied water in real time will be described with reference to FIGS. 4 to 8.

Figure 4:
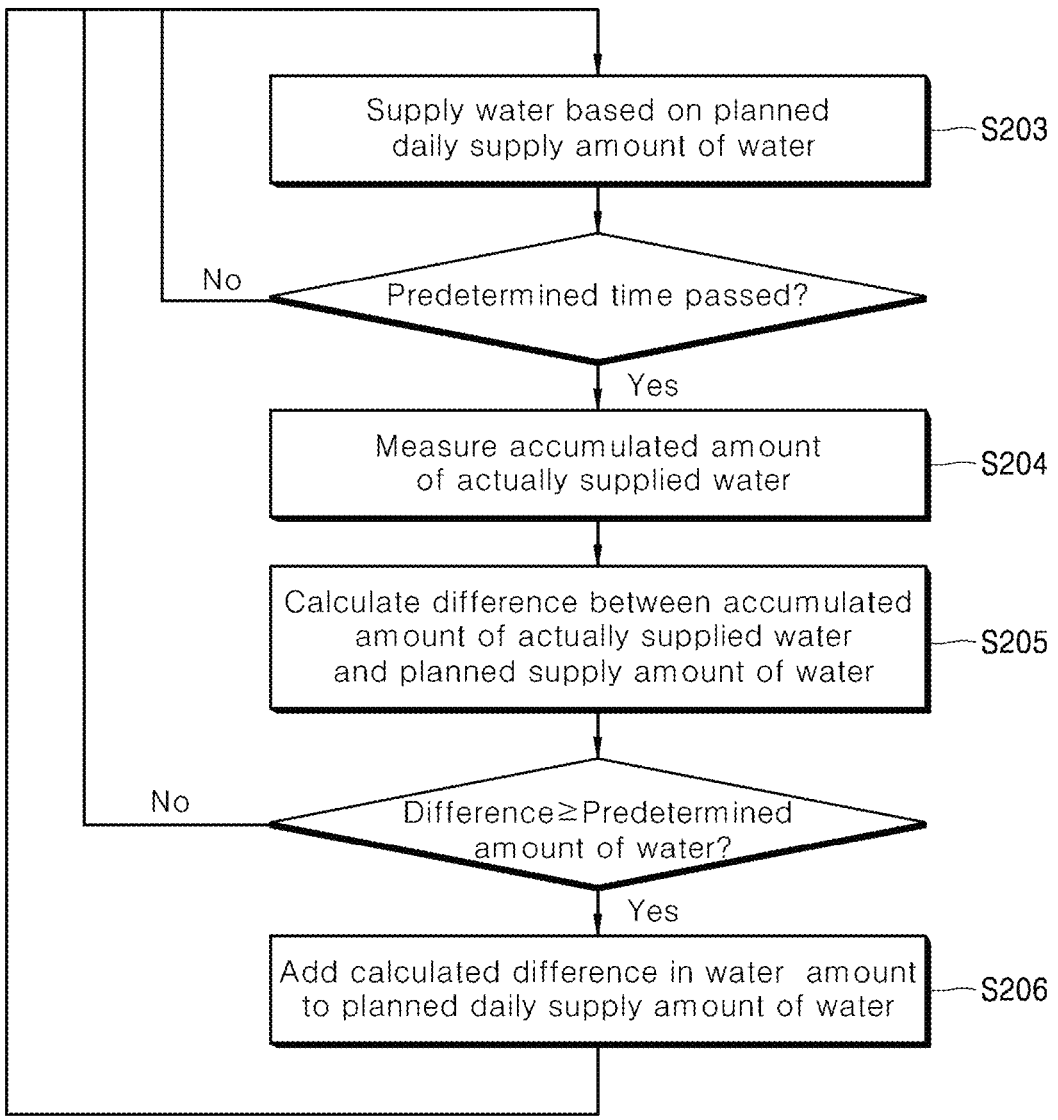
FIG. 4 is a flowchart illustrating a method for correcting the amount of water in real time according to an embodiment of the present disclosure.

FIG. 4 is a flowchart illustrating a method for correcting the amount of water in real time according to an embodiment of the present disclosure.

First, the controller 1 supplies water based on the planned supply amount of water (S203).

The controller 1 may determine whether a predetermined time (e.g., 15 minutes) has passed while supplying water.

The predetermined time, which may be set by the user, is assumed to be 15 minutes in this embodiment.

If it is determined that the predetermined time has not passed since water began to be supplied, the controller 1 supplies water based on the planned supply amount of water.

If it is determined that the predetermined time has passed since water began to be supplied, the accumulated supplied water amount collector 11 in the controller 1 measures an accumulated amount of water actually supplied up to the current time (S204).

Once the accumulated amount of water supplied up to the current time is measured, the error compensator 14 calculates a difference between the accumulated amount of actually supplied water and a planned supply amount of water up to the current time (S205).

If it is determined that the difference between the amount of actually supplied water and the planned supply amount of water up to the current time is less than a predetermined amount of water as a result of calculation, the controller 1 supplies water based on the planned supply amount of water.

If it is determined that the difference between the amount of actually supplied water and the planned supply amount of water up to the current time is greater than or equal to the predetermined amount of water as a result of calculation, the error compensator 14 in the controller 1 resets the planned daily supply amount of water by adding the calculated difference between the amount of actually supplied water and the planned supply amount of water up to the current time to the planned daily supply amount of water (S206). Herein, the planned daily supply amount of water may represent a planned supply amount of water from the current time to a specific time. Specifically, the planned daily supply amount of water may represent a planned supply amount of water from the current time to the midnight (24:00).

Once the calculated difference between the amounts of water is added to the planned supply amount of water, the controller 1 supplies water based on the planned daily supply amount of water (S203).

If it is determined that the difference between the amount of actually supplied water and the planned supply amount of water up to the current time is less than the predetermined amount of water as a result of calculation, the controller 1 does not change the planned daily supply amount of water, but continues to supply water according to the previously calculated planned supply amount of water (S203).

Figure 5:
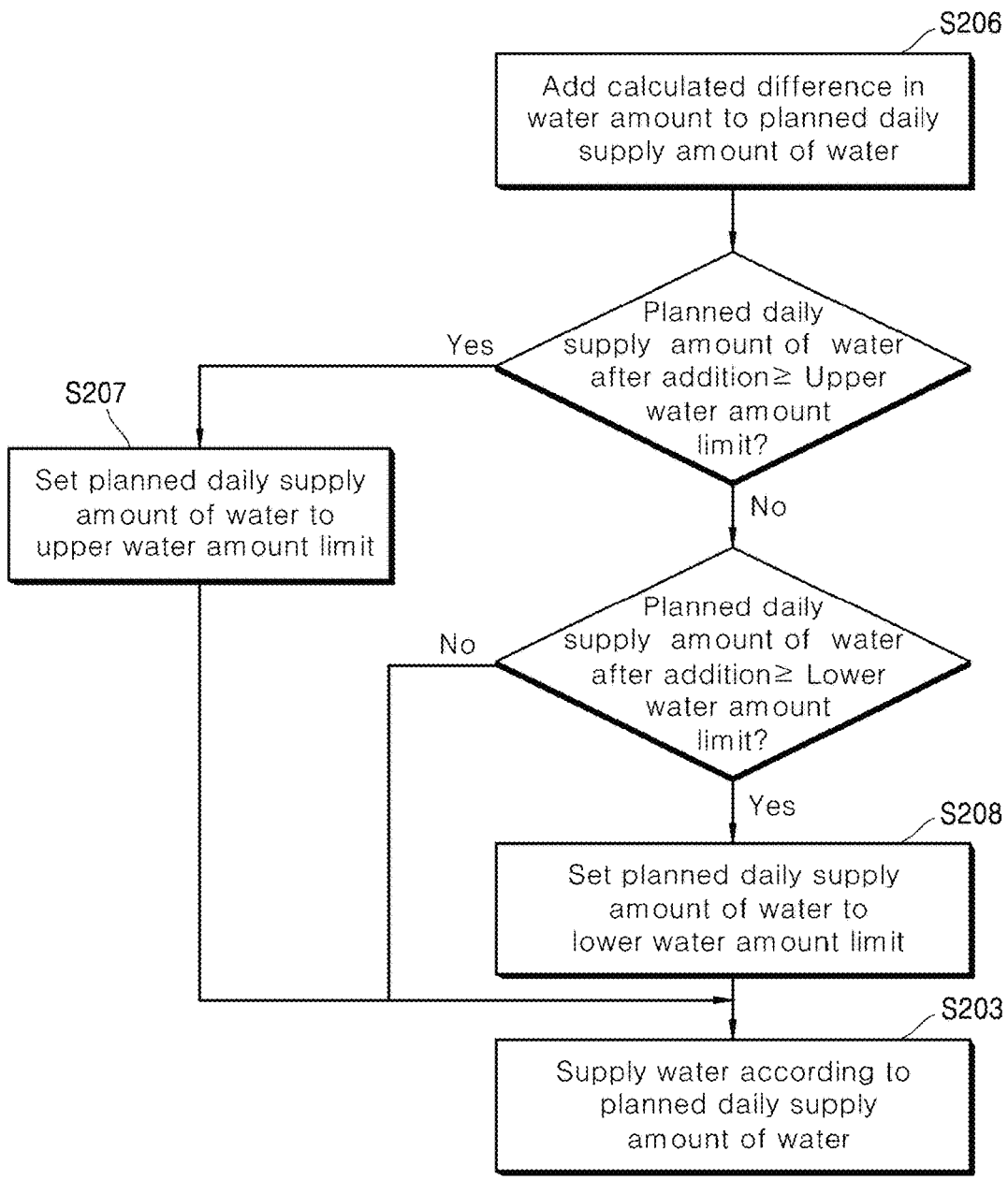
FIG. 5 is a flowchart illustrating a method for changing a planned supply amount of water according to an embodiment of the present disclosure.

FIG. 5 is a flowchart illustrating a method for changing a planned supply amount of water according to an embodiment of the present disclosure.

As shown in FIG. 5, if it is determined that the difference between the amount of actually supplied water and the planned supply amount of water up to the current time is greater than or equal to a predetermined amount of water as a result of calculation of the difference, the error compensator 14 adds the difference between the amount of actually supplied water and the planned supply amount of water up to the current time to the planned daily supply amount of water (S206).

Once the difference in the amount of water is added to the planned supply amount of water by the error compensator 14, the error compensator 14 determines whether the planned supply amount of water after the addition is greater than or equal to a predetermined upper water amount limit.

It is determined that the planned supply amount of water after the addition is greater than or equal to the predetermined upper water amount limit, the error compensator 14 sets the planned daily supply amount of water to the predetermined upper water amount limit (S207).

It is determined that the planned supply amount of water after the addition is less than the predetermined upper water amount limit, the error compensator 14 determines whether the planned supply amount of water after the addition is less than or equal to a predetermined lower water amount limit.

If it is determined that the planned supply amount of water after the addition is less than or equal to the predetermined lower water amount limit, the controller 1 supplies water based on the planned supply amount of water after the addition.

If it is determined that the planned supply amount of water after the addition is less than or equal to the predetermined lower water amount limit, the error compensator 14 sets the planned daily supply amount of water to the lower water amount limit (S208).

Once the planned daily supply amount of water is set to the lower water amount limit, the controller 1 supplies water according to the planned daily supply amount of water set to the lower water amount limit (S203).

If it is determined that the planned supply amount of water after the addition is greater than or equal to the predetermined lower water amount limit, the controller 1 supplies water based on the planned supply amount of water after the addition (S203).

Hereinafter, a method for changing the planned supply amount of water will be described in detail with reference to FIGS. 6 to 8.

Figure 6:
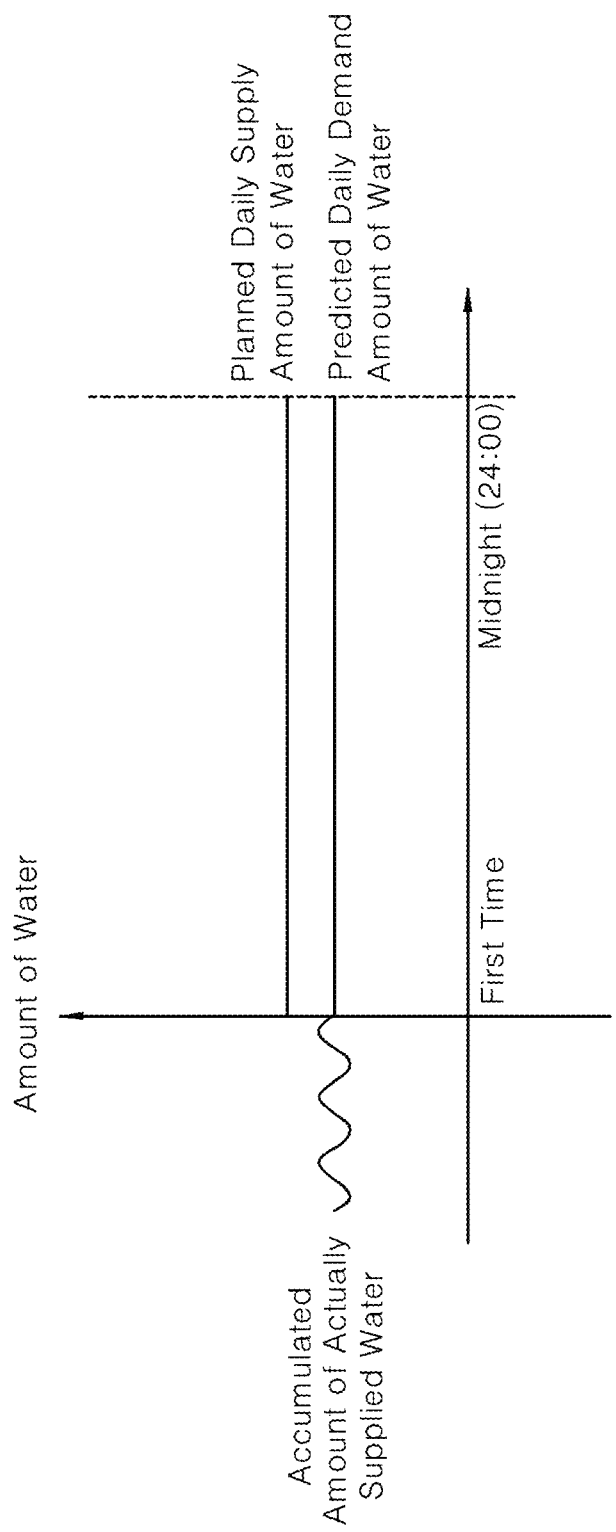
FIG. 6 is a graph depicting a predicted daily demand amount of water and a planned daily supply amount of water based on an accumulated amount of actually supplied water, according to an embodiment of the present disclosure.

FIG. 6 is a graph depicting a predicted daily demand amount of water and a planned daily supply amount of water based on an accumulated amount of actually supplied water.

As shown in FIG. 6, the controller 1 may measure an accumulated amount of water actually supplied up to the current time (first time), calculate a predicted daily demand amount of water from the current time (first time) to the midnight (24:00) based on the measured amount of actually supplied water, and set a planned daily supply amount of water from the current time (first time) to the midnight (24:00) based on the calculated predicted daily demand amount of water.

Figure 7:
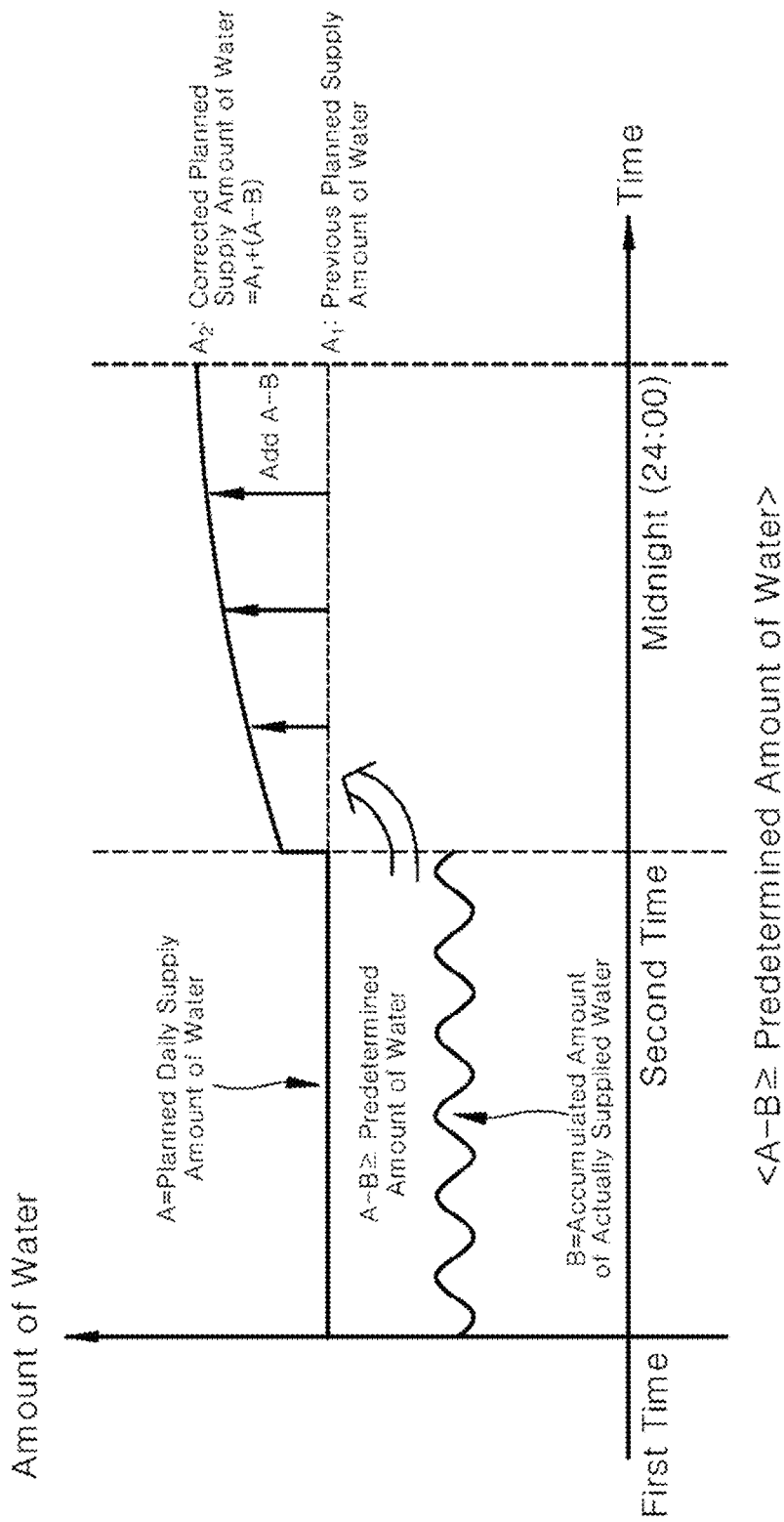
FIGS. 7 and 8 are graphs depicting a planned supply amount of water changed by adding a difference in the amount of water to the predetermined planned supply amount of water according to an embodiment of the present disclosure.
Figure 8:
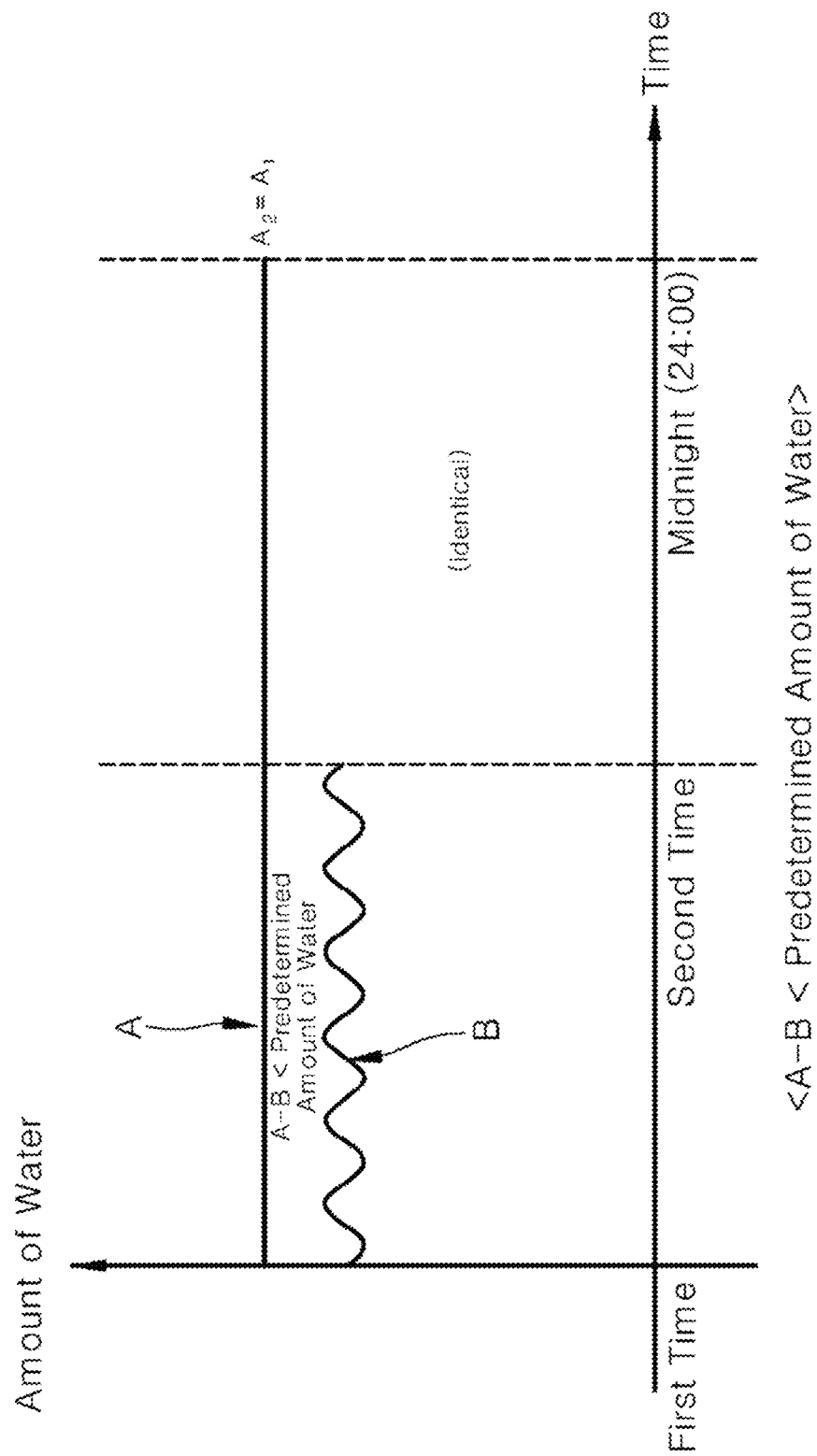

FIGS. 7 and 8 are graphs depicting a planned supply amount of water changed by adding a difference in the amount of water to the predetermined planned supply amount of water according to an embodiment of the present disclosure.

Referring to FIG. 7, when a second time (current time) reaches after a predetermined time (e.g., 15 minutes) passed from a first time, the controller 1 may measure an accumulated amount of water (B) actually supplied from the first time to the second time, which is the current time.

In addition, the controller 1 may acquire a predetermined planned daily supply amount of water (A) to be supplied from the first time to the second time from the storage unit (not shown).

Once the accumulated amount of actually supplied water (B) and predetermined planned daily supply amount of water (A) between the first time and the second time is acquired, the controller 1 may calculate the difference (A−B) between the accumulated amount of actually supplied water (B) and predetermined planned daily supply amount of water (A) in between the first time and the second time.

Once the difference (A−B) between the amounts of water is calculated, the controller 1 determines whether the difference (A−B) between the amounts of water is greater than or equal to a predetermined amount of water.

If it is determined that the difference (A−B) between the amounts of water is greater than or equal to the predetermined amount of water as shown in FIG. 7, the controller 1 may add the calculated difference (A−B) between the amounts of water to the existing predetermined planned supply amount of water (A1) from the second time, which is the current time, to the midnight (24:00) to reset the existing predetermined planned supply amount of water to a corrected planned daily supply amount of water (A2=A1+A−B).

On the other, as shown in FIG. 8, if it is determined that the difference (A−B) between the amounts of water is less than the predetermined amount of water, the controller 1 may maintain the existing predetermined planned supply amount of water (A2=A1) after the current time (second time).

Figure 9:
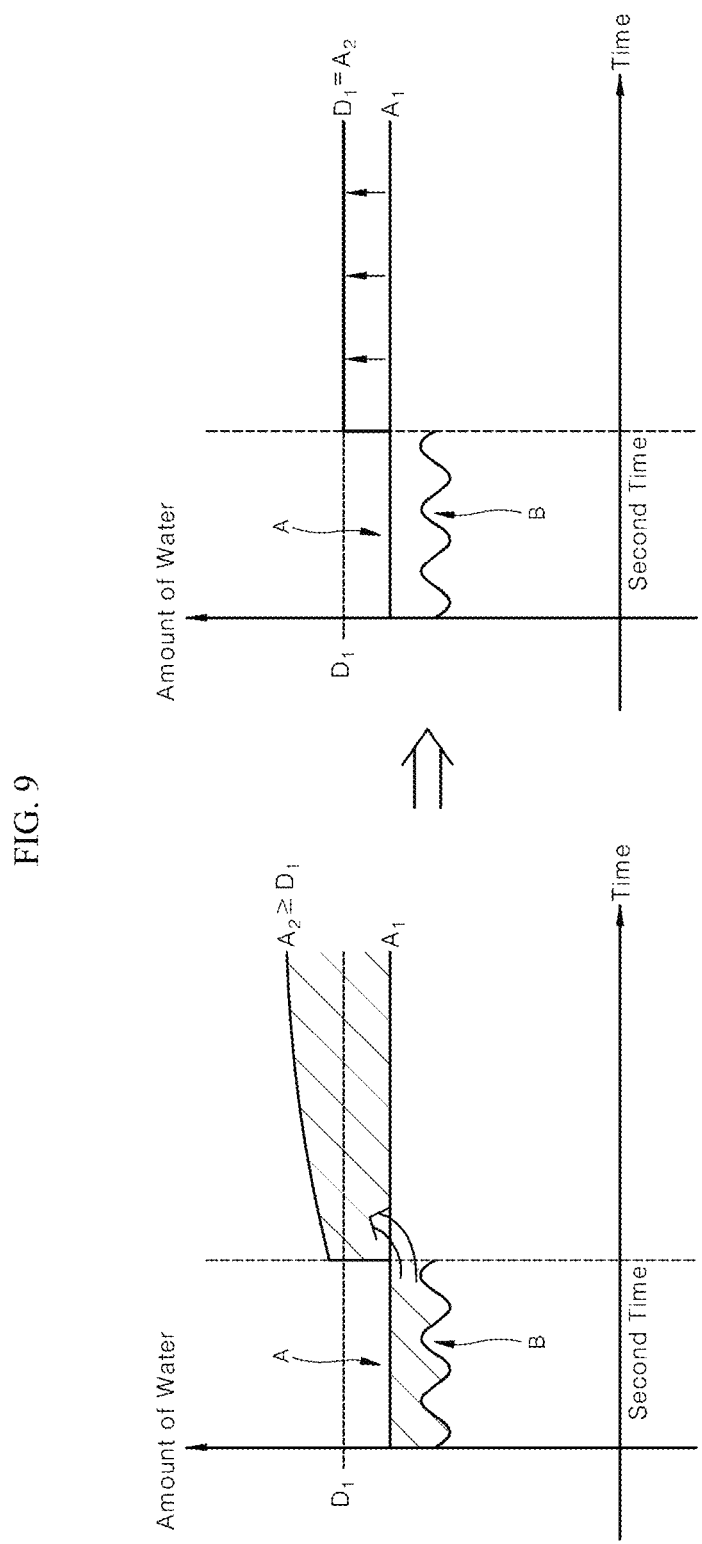
FIGS. 9 and 10 are graphs depicting change of a planned supply amount of water to a lower water amount limit or upper water amount limit according to an embodiment of the present disclosure.
Figure 10:
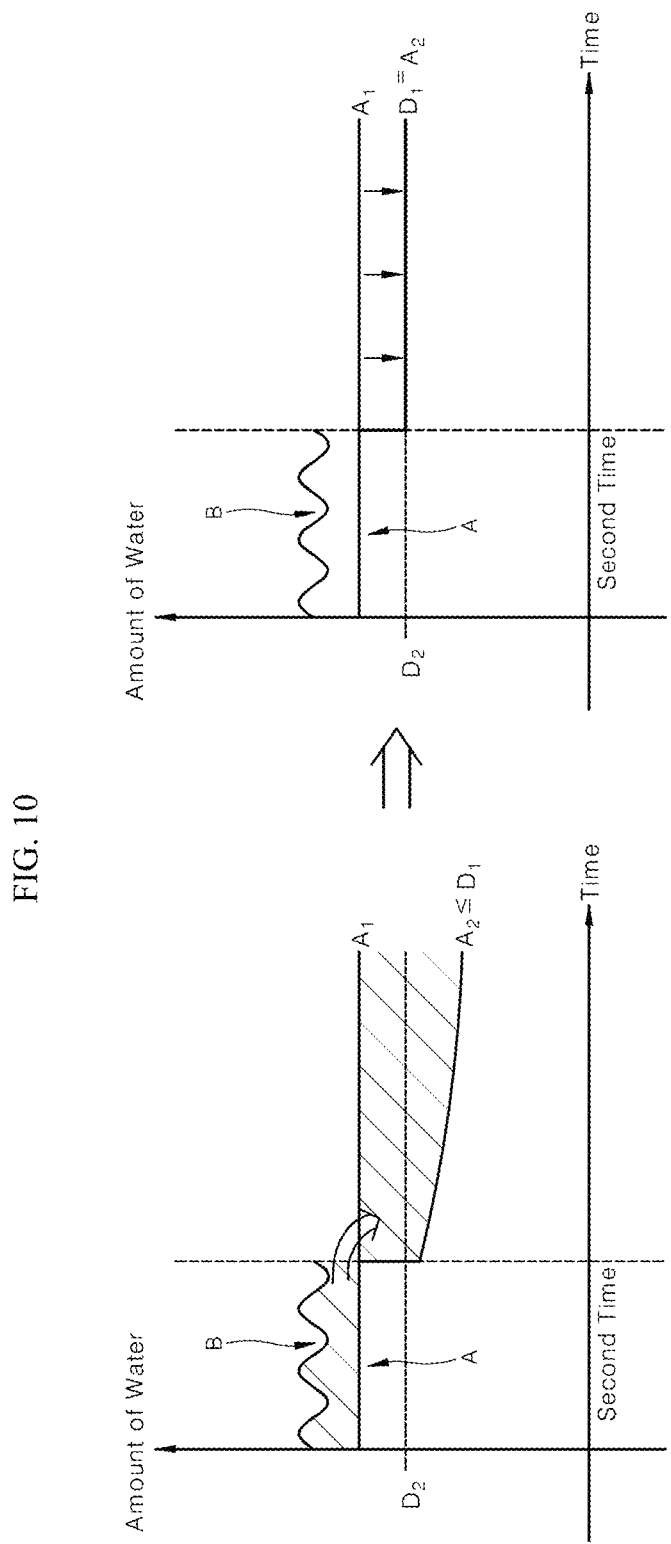

FIGS. 9 and 10 are graphs depicting change of a planned supply amount of water to a lower water amount limit or upper water amount limit according to an embodiment of the present disclosure.

As described above with reference to FIGS. 7 and 8, the controller 1 may acquire the accumulated amount of actually supplied water (B) and planned daily supply amount of water (A) between the first time and the second time, and calculate the difference (A−B) between the accumulated amount of actually supplied water (B) and predetermined planned daily supply amount of water (A) from the first time to the second time. If it is determined that the difference (A−B) between the amounts of water is greater than or equal to a predetermined amount of water, the controller 1 may add the calculated difference (A−B) between the amounts of water to the existing predetermined planned supply amount of water (A1) for the duration from the second time, which is the current time, to the midnight (24:00) to reset the existing predetermined planned supply amount of water to a corrected planned supply amount of water (A2).

As shown in FIG. 9, if it is determined that the corrected planned supply amount of water (A2) is greater than or equal to a predetermined upper water amount limit (D1), the controller 1 may change the corrected planned supply amount of water (A2) to the predetermined upper water amount limit (D1).

As shown in FIG. 10, if it is determined that the corrected planned supply amount of water (A2) is less than or equal to a predetermined lower water amount limit (D1), the controller 1 may change the corrected planned supply amount of water (A2) to the predetermined lower water amount limit (D2).

According to an embodiment of the present disclosure, the method described above can be implemented with processor-readable instructions in a process-readable medium including a recorded program. Examples of the processor-readable medium may include one of ROM, RAM, CD-ROM, magnetic tapes, floppy discs, and optical data storage devices, and also include a carrier-wave type implementation (e.g., transmission via the Internet).

The configuration and method described above are not limited to the embodiments disclosed in the foregoing description. A part or entirety of the embodiments may be selectively combined with each other to enable various modifications.

What is claimed is:

1. A method for supplying water based on a predetermined planned daily supply amount of water, the method comprising:
   measuring an accumulated amount of actually supplied water in real time with a predetermined periodicity;
   acquiring record data about the accumulated amount of actually supplied water after the accumulated amount of actually supplied water is measured;
   calculating a predicted daily demand amount of water based on the accumulated amount of actually supplied water according to a predetermined prediction method after the record data about the accumulated amount of actually supplied water is acquired;
   setting a planned daily supply amount of water based on the predicted daily demand amount of water after the predicted daily demand amount of water is calculated;
   supplying water from a water supply based on at least the planned daily supply amount of water;
   determining whether a second time has been reached after a predetermined time passed from a first time while performing the supplying of the water;
   measuring, when it is determined that the second time has been reached, an accumulated amount of the supplied water;
   calculating a difference between the measured accumulated amount of the supplied water and the planned daily supply amount of water;
   correcting the planned daily supply amount of water by adding the calculated difference to the planned daily supply amount of water; and
   supplying water from the water supply based on the corrected planned daily supply amount of water,
   wherein the method is performed under control of a controller, and
   wherein the planned daily supply amount of water includes plan information about the amount of water to be supplied between a current time at which the planned daily supply amount of water is calculated and a midnight of a date including the current time.

2. The method according to claim 1, wherein the correcting comprises:
   determining whether the difference is greater than or equal to a predetermined amount of water; and
   adding, when it is determined that the difference is greater than or equal to the predetermined amount of water, the calculated difference to the planned daily supply amount of water, and maintaining the predetermined planned daily supply amount of water when it is determined that the difference is less than the predetermined amount of water.

3. The method according to claim 1, wherein the correcting comprises:
   determining whether the planned daily supply amount of water obtained through the adding is greater than or equal to a predetermined upper water amount limit; and
   changing, when it is determined that the planned daily supply amount of water obtained through the adding is greater than or equal to the predetermined upper water amount limit, the planned daily supply amount of water obtained through the adding to the upper water amount limit, and maintaining the planned daily supply amount of water obtained through the adding when it is determined that the planned daily supply amount of water obtained through the adding is less than the predetermined upper water amount limit.

4. The method according to claim 1, wherein the correcting comprises:
   determining whether the planned daily supply amount of water obtained through the adding is less than or equal to a predetermined lower water amount limit; and
   changing, when it is determined that the planned daily supply amount of water obtained through the adding is less than or equal to the predetermined lower water amount limit, the planned daily supply amount of water obtained through the adding to the lower water amount limit, and maintaining the planned daily supply amount of water obtained through the adding when it is determined that the planned daily supply amount of water obtained through the adding is greater than the predetermined lower water amount limit.

5. The method according to claim 1, further comprising:
   calculating a plurality of first predicted demand amounts of water according to a plurality of combinations of applying a weight to each of a plurality of demand predictions; and
   calculating the difference between the measured accumulated amount of the supplied water and each of the predicted demand amounts of water and selecting a combination for calculating a second predicted demand amount of water including a smallest difference from among the predicted demand amounts of water; and
   correcting the planned daily supply amount of water after the second time according to the selected combination.

* * * * *